(12) United States Patent
Boss et al.

(10) Patent No.: US 9,851,962 B2
(45) Date of Patent: *Dec. 26, 2017

(54) INITIATING USE OF SOFTWARE AS PART OF A MESSAGING WINDOW

(71) Applicant: International Business Machines Corporation, Armonk, NY (US)

(72) Inventors: Gregory J. Boss, Saginaw, MI (US); Jason L. Crawford, Yorktown Heights, NY (US); James R. Kozloski, New Fairfield, CT (US); Clifford A. Pickover, Yorktown Heights, NY (US); Anne R. Sand, Canon City, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,138

(22) Filed: Jun. 13, 2016

(65) Prior Publication Data

US 2016/0291954 A1  Oct. 6, 2016

Related U.S. Application Data

(63) Continuation of application No. 14/042,879, filed on Oct. 1, 2013, now Pat. No. 9,454,353.

(51) Int. Cl.
*G06F 9/445* (2006.01)
*G06F 3/0481* (2013.01)
*G06F 3/0486* (2013.01)

(52) U.S. Cl.
CPC .............. *G06F 8/61* (2013.01); *G06F 3/0486* (2013.01); *G06F 3/04817* (2013.01)

(58) Field of Classification Search
CPC ....................................................... G06F 9/445
(Continued)

(56) References Cited

U.S. PATENT DOCUMENTS 5,666,501 A  9/1997  Jones et al. ................... 715/748
5,714,971 A  2/1998  Shalit ..................... G06F 3/0481
                                                          715/792

(Continued)

FOREIGN PATENT DOCUMENTS

EP       2226713        9/2010

OTHER PUBLICATIONS

Farpoint Technologies, Inc., "Using OLE Drag and Drop," A whitepaper for developers using FarPoint controls, copyright 2006 FarPoint Technologies, Inc., 12 pages, www.fpoint.com.

(Continued)

*Primary Examiner* — Jae Jeon
(74) *Attorney, Agent, or Firm* — Fleit Gibbons Gutman Bongini Bianco PL; Jon A. Gibbons

(57) ABSTRACT

Disclosed is a novel system and method for initiating trial use of a software application. One or more trial software icons are displayed on a messaging window of a graphical users interface on a display coupled to a computing device. Each trial software icon represents a trial software application, such as a separate and distinct trial software application, that is not currently installed on the computing device. Moving an object representing a file attachment, such as through drag-and-drop action, to one of the trial software icons automatically installs the trial software application on the computing device. Also the trial software application is launched automatically to open the file attachment.

20 Claims, 11 Drawing Sheets

(58) Field of Classification Search
USPC .................................................. 717/174–178
See application file for complete search history.

(56) References Cited

U.S. PATENT DOCUMENTS

| | | | |
|---|---|---|---|
| 5,771,347 A | 6/1998 | Grantz et al. ................... | 726/31 |
| 5,883,955 A | 3/1999 | Ronning .......................... | 705/52 |
| 6,073,124 A | 6/2000 | Krishnan et al. ............... | 705/59 |
| 6,314,408 B1 | 11/2001 | Salas et al. | |
| 6,341,314 B1 | 1/2002 | Doganata et al. | |
| 6,385,654 B1 | 5/2002 | Tanaka .................... | H04L 67/06 |
| | | | 709/216 |
| 6,411,311 B1 | 6/2002 | Rich et al. | |
| 7,376,696 B2 | 5/2008 | Bell ....................... | G06F 3/0486 |
| | | | 709/203 |
| 7,665,028 B2 | 2/2010 | Cummins et al. | |
| 7,665,032 B2 | 2/2010 | Fisher et al. | |
| 7,783,708 B2 | 8/2010 | Zaner-Godsey ..... | G06Q 10/107 |
| | | | 709/206 |
| 8,621,386 B2 * | 12/2013 | Mulloy ................ | G06F 9/4443 |
| | | | 715/789 |
| 2002/0004785 A1 | 1/2002 | Schull ............................ | 705/51 |
| 2002/0038612 A1 * | 4/2002 | Iwazaki ............. | H04N 1/00127 |
| | | | 101/484 |
| 2003/0088515 A1 | 5/2003 | Cooper et al. .................. | 705/50 |
| 2003/0181242 A1 | 9/2003 | Lee et al. ........................ | 463/42 |
| 2006/0265708 A1 * | 11/2006 | Blanding ................. | G06F 8/65 |
| | | | 717/174 |
| 2007/0101291 A1 | 5/2007 | Forstall ................ | G06F 3/0482 |
| | | | 715/805 |
| 2007/0130073 A1 | 6/2007 | Celli et al. ...................... | 705/51 |
| 2007/0150886 A1 * | 6/2007 | Shapiro .................... | G06F 8/61 |
| | | | 717/174 |
| 2007/0168266 A1 | 7/2007 | Questembert .......... | G06O 20/06 |
| | | | 705/35 |
| 2008/0168087 A1 | 7/2008 | Repetti et al. | |
| 2009/0064055 A1 | 3/2009 | Chaudhri ............ | G06F 3/04817 |
| | | | 715/863 |
| 2009/0193363 A1 * | 7/2009 | Atherton ............. | G06F 3/04817 |
| | | | 715/835 |
| 2009/0210870 A1 * | 8/2009 | Clark ...................... | G06F 9/445 |
| | | | 717/178 |
| 2009/0228824 A1 | 9/2009 | Forstall ............... | G06F 3/04817 |
| | | | 715/779 |
| 2011/0167339 A1 * | 7/2011 | Lemay .................... | H04L 51/08 |
| | | | 715/255 |
| 2011/0231280 A1 | 9/2011 | Farah ..................... | G06O 10/10 |
| | | | 705/26.8 |
| 2012/0072853 A1 | 3/2012 | Krigstrom ............ | G06F 3/0488 |
| | | | 715/748 |
| 2012/0278722 A1 | 11/2012 | Raleigh .................. | H04L 12/14 |
| | | | 715/735 |
| 2012/0278727 A1 | 11/2012 | Ananthakrishnan et al. | |
| 2014/0109080 A1 | 4/2014 | Ricci ........................ | G06F 8/61 |
| | | | 717/174 |
| 2015/0100552 A1 | 4/2015 | Malis .................... | G06Q 10/06 |
| | | | 707/650 |

OTHER PUBLICATIONS

Fiaidhi, J., "Towards Developing Installable e-Learning Objects Utilizing the Emerging Technologies in Cairn Computing and Ubiquitous Learning," International Journal of u-and e-Service, Science and Technology, vol. 4, No. 1, Mar. 2011, pp. 9-19.

* cited by examiner

| ENCODING IDENTIFIED | NAME OF | WINDOWS COMPATIABLE APPLICATION | MAC COMPATIABLE APPLICATION | LINUX | RANKING | RATING | PRICE |
|---|---|---|---|---|---|---|---|
| TXT | TEXT | PROGRAM 1 | PROGRAM 10 | PROGRAM 20 | 6 | 5 | 0.1 |
| | | PROGRAM 2 | PROGRAM 11 | PROGRAM 21 | 1 | 2 | 0.2 |
| | | PROGRAM 3 | PROGRAM 12 | PROGRAM 22 | 4 | 3 | 0.1 |
| | | PROGRAM 4 | PROGRAM 13 | | 2 | 1 | 0.2 |
| | | PROGRAM 5 | | | 5 | 4 | 0.3 |
| PDF | PORTABLE DOCUMENT FORMAT | PROGRAM 1 | PROGRAM 11 | PROGRAM 50 | 2 | 2 | 0.1 |
| | | PROGRAM 30 | PROGRAM 12 | PROGRAM 51 | 4 | 5 | 0.1 |
| | | PROGRAM 31 | PROGRAM 40 | PROGRAM 51 | 5 | 4 | 0.3 |
| | | PROGRAM 32 | PROGRAM 41 | PROGRAM 53 | 6 | 6 | 0.1 |
| | | PROGRAM 33 | PROGRAM 42 | PROGRAM 54 | 3 | 3 | 0.1 |
| | | PROGRAM 34 | | PROGRAM 55 | 1 | 1 | 0.1 |
| | | PROGRAM 35 | | | 7 | 9 | 0.5 |
| | | PROGRAM 36 | | | 8 | 8 | 0.3 |
| | | PROGRAM 37 | | | 10 | 7 | 0.2 |
| | | PROGRAM 38 | | | 9 | 10 | 0.1 |
| MP3 | MOVING PICTURE EXPERTS GROUP | PROGRAM 60 | PROGRAM 70 | PROGRAM 80 | 1 | 1 | 0.1 |
| | | PROGRAM 61 | PROGRAM 71 | PROGRAM 81 | 3 | 3 | 0.5 |
| | | PROGRAM 62 | PROGRAM 72 | | 2 | 4 | 0.2 |
| | | PROGRAM 63 | PROGRAM 73 | | 4 | 2 | 0.2 |
| MOV | APPLE QUICKTIME MOVIE | PROGRAM 90 | PROGRAM 100 | PROGRAM 110 | 1 | 1 | 0.1 |
| | | PROGRAM 91 | PROGRAM 101 | PROGRAM 111 | 2 | 2 | 0.1 |
| | | PROGRAM 92 | PROGRAM 102 | PROGRAM 112 | 3 | 3 | 0.2 |
| | | PROGRAM 93 | PROGRAM 103 | PROGRAM 113 | 5 | 5 | 0.2 |
| | | PROGRAM 94 | PROGRAM 104 | PROGRAM 114 | 4 | 4 | 0.1 |
| ... | ... | ... | ... | ... | ... | ... | ... |

FIG. 9

INITIATING USE OF SOFTWARE AS PART OF A MESSAGING WINDOW

BACKGROUND

The present invention generally software for opening file attachments in an email program, text messaging program, and web-browser program. More specifically the present invention is directed to using trial software for opening file attachments.

Users of computer systems and portable devices often times receive messages though messaging applications with files attached to them. These attachments can be sent by email, by text messaging, or through a web-browser. Typically when a user receives an attachment or file, another program must be invoked to open the attachment. To open an attachment with a program many operating systems such as Linux, Mac OS, and Microsoft Windows use a technique called file association. File association matches a file with an application capable of opening that file. More commonly, a file association associates a class of files, usually determined by their filename extension, such as ".txt", with a corresponding application, such as a text editor. A single file association may have one or more actions such as open, edit, or print.

More recently, some operating systems, such as Microsoft Windows, first check for the file association information locally. If no local information is available about the file name extension, the operating system offers the user the option of looking for more information online over the Internet. Although this online search can be useful, the search results are limited only to a single site, such as the site provided by the provider of the operating system. Moreover, the search results are limited to one application with no information regarding other free or fee-based alternatives. Further, these options are not presented automatically or in the window as part of the messaging application in which the file attachment has been received.

SUMMARY

Disclosed is a computer implemented method, system, and computer program product for initiating trial use of a software application. One or more trial software icons are displayed on a messaging window of a graphical users interface on a display coupled to a computing device. Each trial software icon represents a trial software application, such as a separate and distinct trial software application, that is not currently installed on the computing device. Moving an object representing a file attachment, such as through-n-drop action, to one of the trial software icons automatically installs the trial software application on the computing device. Also the trial software application is launched automatically to open the file attachment.

The arrangement of the trial software icons relative to the messaging window, and/or appearance of the trial software icons as part of the messaging window can be changed in response to a number of different sorting factors. One example of a sorting factor is the relative popularity of the trial software application that can be measure by the frequency of installations. The relative position of the trial software application is sorted based on popularity. Another example of a sorting factor is based on advertising payments associated with each trial software application. In this example, the relative position of the trial software application is sorted based on the amount of the payment. Other examples of sorting factors are given below.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 9 is a table of sorting factors used to present trial software icons;

DETAILED DESCRIPTION

Figure 1:
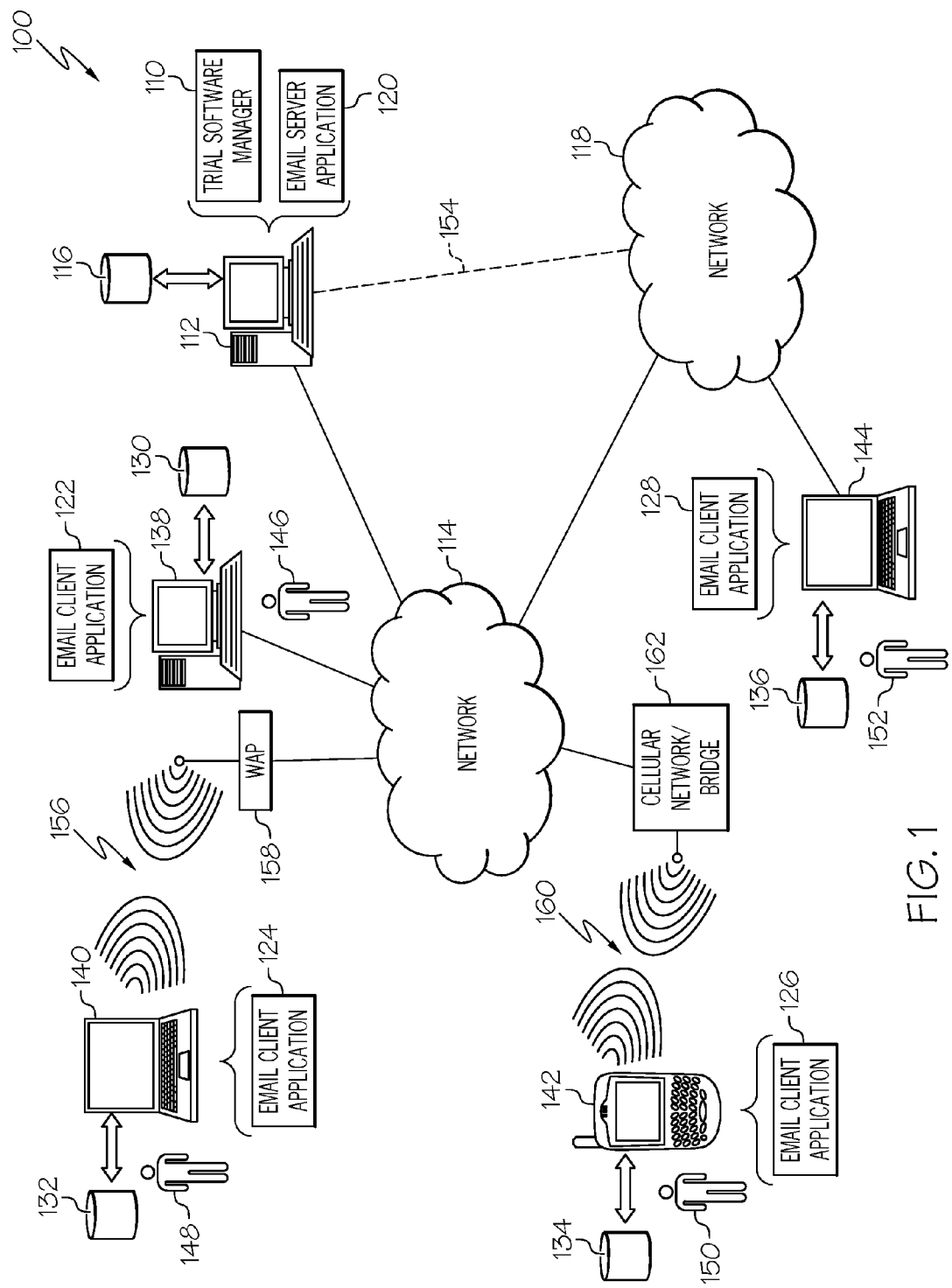
FIG. 1 diagrammatically depicts an email application coupled to a distributed computing network.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Non-Limiting Definitions

The terminology used herein is for the purpose of describing particular embodiments only and is not intended to be limiting of the invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, integers, steps, operations, elements, components, and/or groups thereof.

The term "appearance" as it applies to a trial software icons denotes any change in size, color, font, shape, or animation to denote order based on one more sorting factors.

The term "compatible with" means the encoding format used for the particular contents or usage of the file attachment can be viewed, played, or used with any one of the one of the trial software applications represented by the trial software icons.

The term "computing device" is any device, such as a computer, smartphone, tablet, television, or other information processing device in which software can be installed to view various file attachments.

The term "drag-and-drop" is a gesture typically performed with a pointing device, such as a mouse, on a graphical user interface to move a virtual object it by dragging it to a different location or onto another virtual object.

The term "file attachment" is any object representing text, graphics, pictures, audio, movies, whether in 2D or 3D, or a combination thereof. Typically the file attachment uses an encoding format for its particular contents or usage. The type of encoding format used in a file attachment is denoted in metadata, such as a file extension. Examples of file extensions denoting encoding formats include txt, pdf, mp3, mov, zip, jpg, png, and many more.

The term "messaging window" is a visual area containing some kind of user interface. It usually has a rectangular shape and can overlap with the area of other windows. It displays the output of and may allow input to one or more processes. Examples of messaging windows include but are not limited, to an email program, a text messaging program, and a web-browser program.

The term "no currently installed" refers to a trial software application that is not available to a user of a computing device to view a file attachment. Typically the trial software application must be installed or enabled before the file attachment can be displayed.

The phrase "position with respect to messaging window" refers to a trial software icons being sorted and placed in a one dimensional, two dimensional or three-dimensional order based on one more sorting factors.

The term "trial software application" is software that a user can try before they purchase a license to it. This term is also used for software that is free, also known as freeware. Typically the use of trial software is time limited or limited by the number of uses. If the time for the trial time runs out or the limited number of uses of the software exhausted, the trial software is no longer available to the user unless a license is purchased.

The term "trial software icon" is a pictogram on a graphical user interface to represent trial software application that may be activated by dragging and dropping a file attachment to it.

Distributed Computer System

Referring to FIG. 1, there is a distributed computer system 100 that may be used to carry out the trial use of a software application. In one example, the trial software application may reside on and be executed by server computer 120, which may be connected to network 114 e.g., the Internet or a local area network. Examples of server computer 120 may include, but are not limited to: a personal computer, a server computer, a series of server computers, a mini computer, and a mainframe computer. Server computer 120 may be a web server or a series of servers running a network operating system, examples of which may include but are not limited to Microsoft Windows Server or Linux, for example. Alternatively, email propagation process may reside on a client electronic device, such as a personal computer, notebook computer, personal digital assistant, or the like. As will be discussed below in greater detail, an email user is presented on the email program different icons representing applications to open attachments. One an icon is selected by the user, the trial software is installed, launched and the file attachment opened.

The instruction sets and subroutines of the process to present trial software applications to the user 110, which may be stored on storage device 116 coupled to server computer 112, may be executed by one or more processors (not shown) and one or more memory architectures (not shown) incorporated into server computer 112. Storage device 116 may include but is not limited to: a hard disk drive; a tape drive; an optical drive; a RAID array; a random access memory (RAM); and a read-only memory (ROM).

Server computer 112 may execute a web server application, examples of which may include but are not limited to IBM Websphere or Apache Webserver™, that allows for HTTP (i.e., HyperText Transfer Protocol) access to server computer 112 via network 114. Network 114 may be connected to one or more secondary networks e.g., network 118, examples of which may include but are not limited to: a local area network; a wide area network; or an intranet, for example.

Server computer 112 may execute email server application 120, examples of which may include but are not limited to Lotus Domino Server and Microsoft Exchange Server. Mail server application 120 may be a mail transfer agent that may store and route email to one or more email client applications 122, 124, 126, 128, examples of which may include but are not limited to Lotus Notes™ and Microsoft Outlook™. The computer code for the trial software manager 110 may be a standalone application that interfaces with email server application 120 or an applet/application that is executed within email server application 120. In another example the program to present trial software is downloaded an installed as part of extension or plug-in to an email client running on the client applications 122, 124, 126, 128.

The instruction sets and subroutines of email server application 120, which may be stored on storage device 116 coupled to server computer 112 may be executed by one or more processors (not shown) and one or more memory architectures (not shown) incorporated into server computer 112.

In addition/as an alternative to being a server-based application residing on server computer 112, the email propagation process may be a client-side application residing on one or more client electronic devices 138, 140, 142, 144, e.g., stored on storage devices 130, 132, 134, 136, respectively. As a client-side application, email propagation process may, e.g., be a standalone application, interface with an email client application, or may be an applet/application that is executed within email client application. Accordingly, email propagation process may be a server-based process, a client-side process and/or may be a hybrid client-side/server-based process, which may be executed, in whole or in part, by email client application and by email server application.

The instruction sets and subroutines of email client applications 122, 124, 126, 128, which may be stored on storage devices 130, 132, 134, 136 (respectively) coupled to client electronic devices 138, 140, 142, 144 (respectively), may be executed by one or more processors (not shown) and one or more memory architectures (not shown) incorporated into client electronic devices 138, 140, 142, 144 (respectively). Storage devices 130, 132, 134, 136 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of computing devices 138, 140, 142, 144 may include, but are not limited to, personal computer 138, laptop computer 140, cellular telephone 142, notebook or table computer 144, and a dedicated network device (not shown). Using email client applications 122, 124, 126, 128, users 146, 148, 150, 152 may access email server application 20 and may send, retrieve and/or organize email messages.

Users 146, 148, 150, 152 may access email server application 120 directly through the device on which the email client applications 122, 124, 126, 128 are executed, namely on client electronic devices 138, 140, 142, 144. Users 146, 148, 150, 152 may access email server application 120 directly through network 114 or through secondary network 118. Further, server computer 112 (i.e., the computer that executes email server application 120) may be connected to network 114 through secondary network 118, as illustrated with phantom link line 154.

The various client electronic devices may be directly or indirectly coupled to network 114 (or network 118). For example, personal computer 138 is shown directly coupled to network 114 via a hardwired network connection. Further, notebook computer 144 is shown directly coupled to network 118 via a hardwired network connection. Laptop computer 140 is shown wirelessly coupled to network 114 via wireless communication channel 156 established between laptop computer 140 and wireless access point (i.e., WAP) 158, which is shown directly coupled to network 114. WAP 158 may be, for example, an IEEE 802.11a, 802.11b, 802.11g, Wi-Fi, and/or Bluetooth device that is capable of establishing wireless communication channel 156 between laptop computer 140 and WAP 158. Personal digital assistant 142 is shown wirelessly coupled to network 114 via wireless communication channel 160 established between personal digital assistant 142 and cellular network/bridge 162, which is shown directly coupled to network 114.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 138, 140, 142, 144 may each execute an operating system, examples of which may include but are not limited to Microsoft Windows, Apple iOS, Google Android, Linux, BlackBerry OS or a custom operating system.

Trial Software Application Presentation

Figure 2:
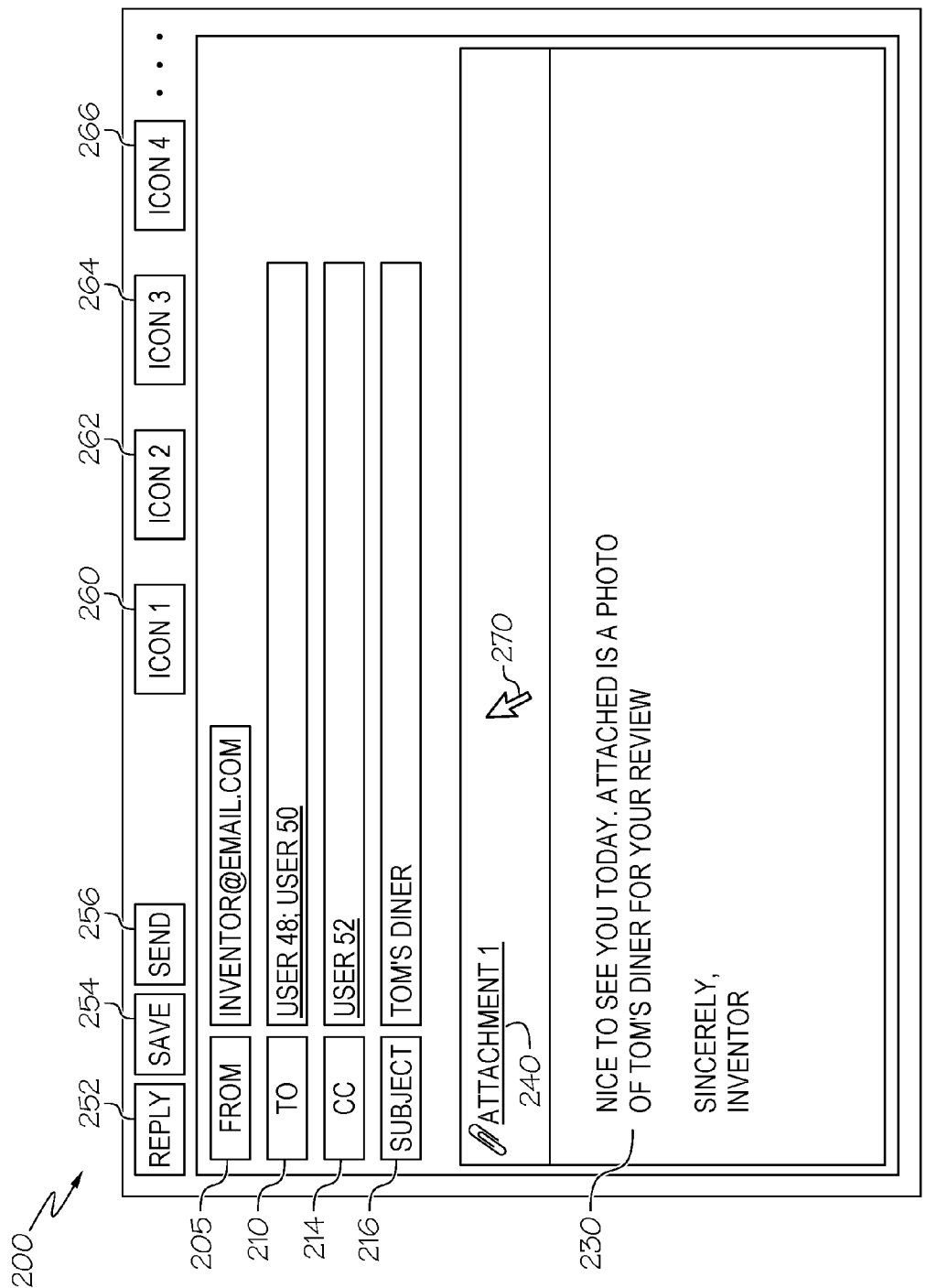
FIG. 2 is a diagram of an email client window as part of an email application of FIG. 1.

Referring also to FIG. 2, an email client 122, 124, 126, 128 associated with a user 146, 148, 150, 152 has received an email message 200. The email message has several typical fields of information. The "From" field 210, the "To" field 212, the "cc" filed 214, the "Subject" field and the message body 220. Also shown is an "attachment" field often displayed with a paper clip icon 240. Typical user selectable icons such as "Reply" 252, "Save" 254, and "Delete" 256 are also shown, whose functions are well known to email users. Also shown are a series of icons 260, 262, 264, 266, each of these icons represent a trial software application that is compatible with the attachment 240. The term "compatible with" means the encoding format used for the particular contents or usage of the file attachment can be viewed, played, or used with any one of the one of the trial software applications represented by the trial software icons 260, 262, 264, 266.

Typically the file attachment uses an specific encoding format for its particular contents or usage. The type of encoding format used in a file attachment is denoted in metadata, such as a file extension, however other types of metadata such as descriptors may be used. Examples of file extensions denoting encoding formats include txt, pdf, mp3, mov, zip, jpg, png, and many more.

Figure 3:
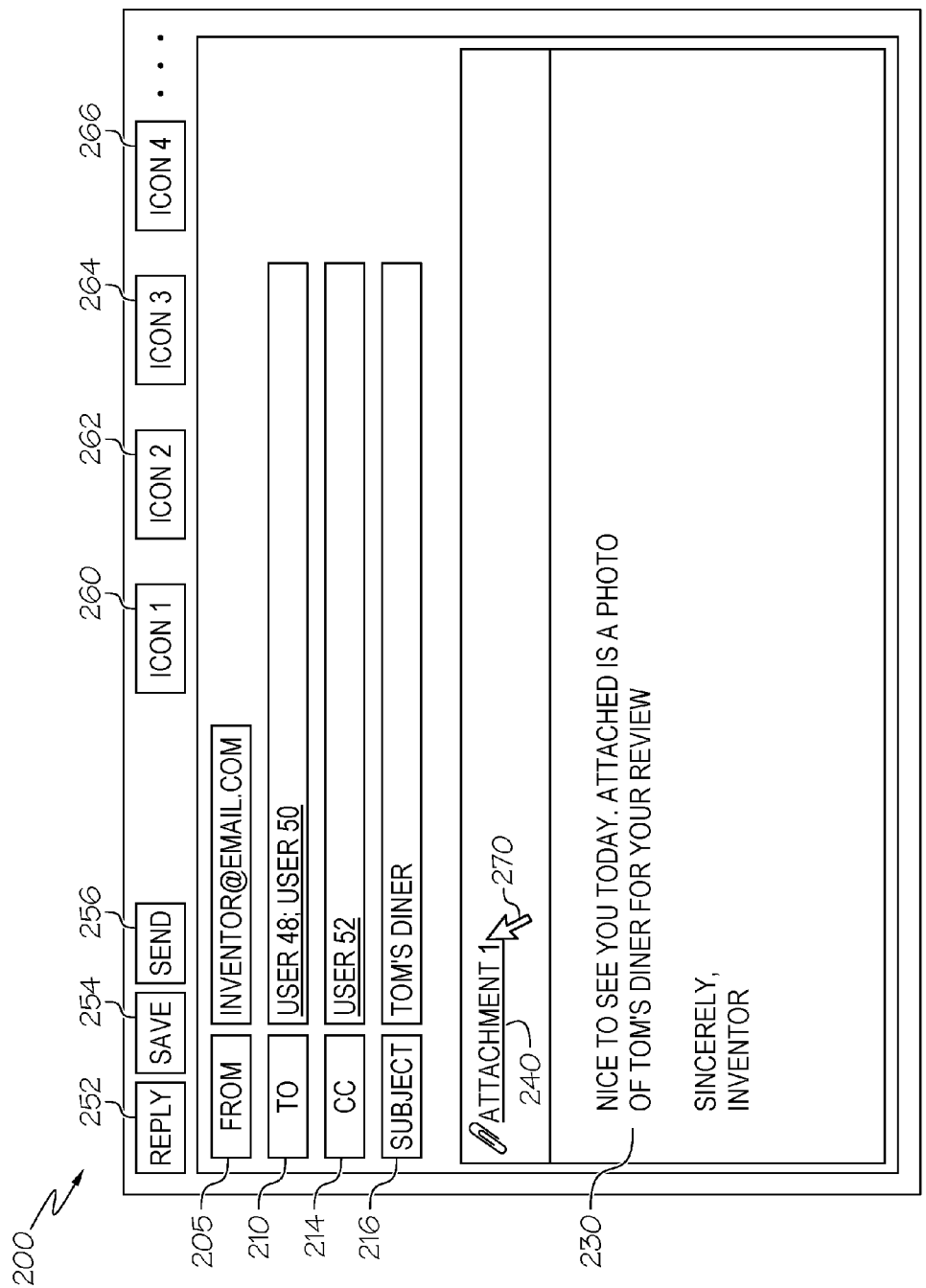
FIG. 3 is the email client window of FIG. 2, showing the cursor moving at a first point in time to drag-and-drop a file attachment to one or more trial software icons.
Figure 4:
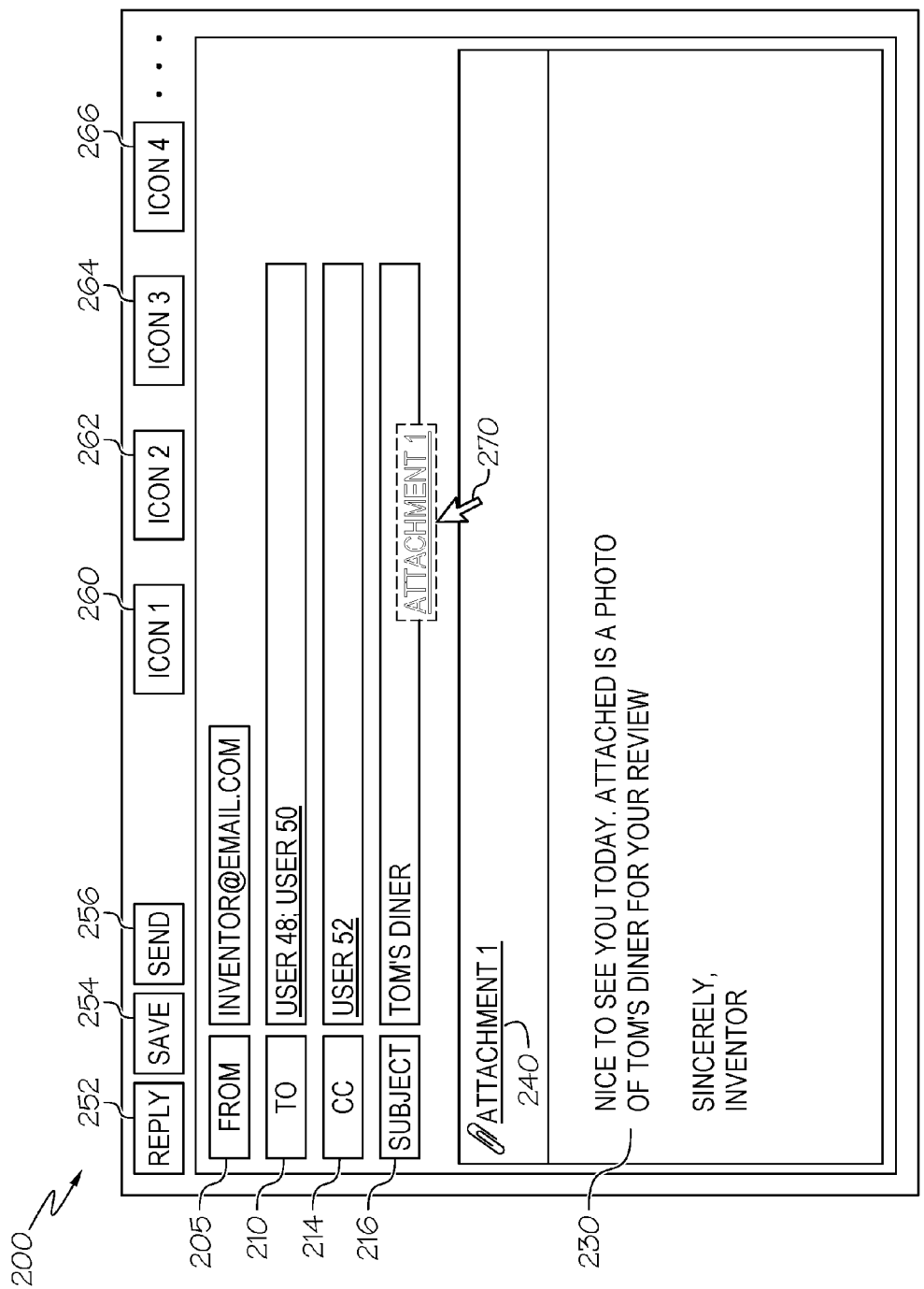
FIG. 4 is the email client window of FIG. 2, showing the cursor moving at a second point in time to drag-and-drop a file attachment to one or more trial software icons.
Figure 5:
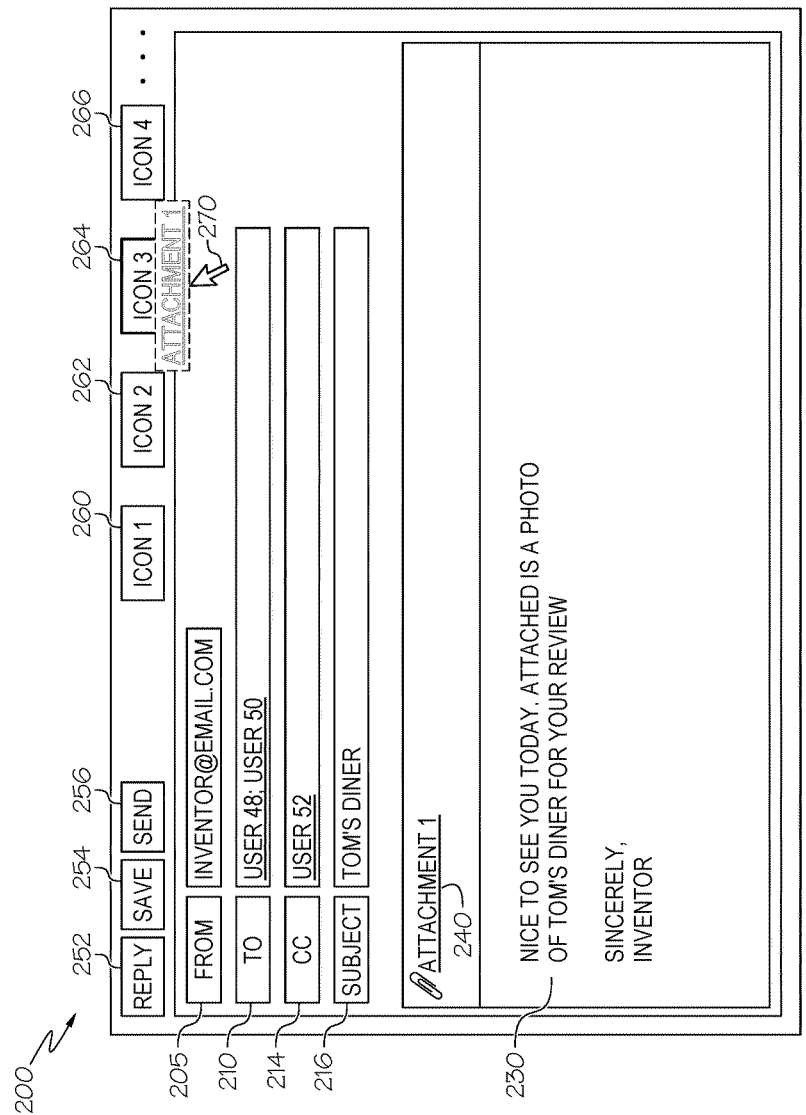
FIG. 5 is the email client window of FIG. 2, showing the cursor moving at a third point in time to drag-and-drop a file attachment to one or more trial software icons.

As shown in FIG. 3 through FIG. 5 is a series of the diagrammatic view of the email client window rendered by the email application of FIG. 2, showing the cursor 270 moving in several points in time to drag-and-drop a file attachment 240 to trial software icon 264. It is important to note that the position with respect to messaging window 200 of the trial software icons 260, 262, 264, and 266, in one example are sorted and placed in a one dimensional, two dimensional or three-dimensional order based on one more sorting factors. This automatic sorting will be discussed further below.

Figure 6:
FIG. 6 is a block diagram of a process window of installing the trial software application as a result of the drag-and-drop of FIG. 5, while the email client window has been minimized or placed in the background.
Figure 7:
FIG. 7 is a block diagram of a process window of opening and viewing the file attachment using the trial software application that has been installed in FIG. 6.
Figure 8:
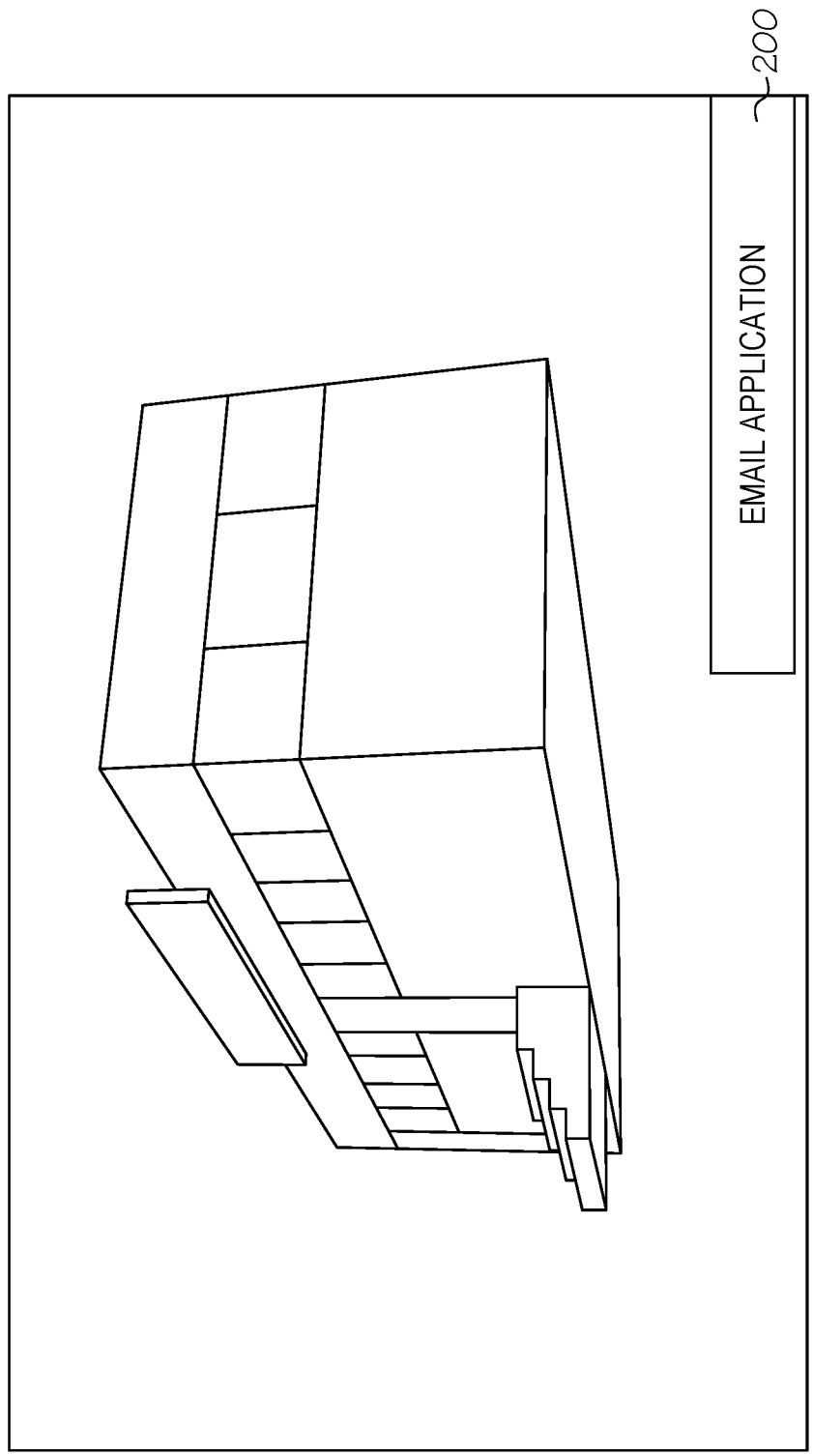
FIG. 8 is a block diagram of the file attachment representing an image that has been opened using the installed trial software program.

Continuing further FIG. 6 is a block diagram of a process window of installing the trial software application as a result of the drag-and-drop of FIG. 5, while the email client window 200 has been minimized or placed in the background. Next, in FIG. 7 a block diagram of a process window of opening and viewing in the file attachment 240 using the trial software application 264 that has been installed in FIG. 6. FIG. 8 is the file attachment 240 representing an image that has been opened using the installed trial software program 264. Note that the viewing of the image has been automatically brought to the foreground in this example. This is important when using computing devices that have small screens, such as mobile and handheld devices, in which screen real estate is very limited.

Trial Software Manager 110

The trial software manager 110, in one example, is responsible for both the selecting and sorting the position with respect to messaging window 200 of the trial software icons 260, 262, 264, and 266. The trial software manager 110 first determines the encoding format used for the particular contents or usage of the file attachment 240. The encoding format is required to view, play, or otherwise use the content in the file attachment. For example, the trial software manager 110 can examine metadata about the file attachment 240, such as but not limited to file extension. Examples of file extensions denoting encoding formats include txt, pdf, mp3, mov, zip, jpg, png, and many more.

FIG. 9 is an example table 900 of some of the sorting factors used to select the trial software icons. In column 910 the encoding types are identified. The name of the encoding format in column 912. This may be used in conjunction with or instead of the file extension to identify the encoding format of the attachment. Again, first the type of encoding is determined, next a sorting order is determined. Next depending on the operating system, different programs are available that are compatible with a file attachment. For example, shown are three operating systems—Window 914, Mac 916, and Linux 918 with a list of compatible programs associated with each encoding format. Although three example operating systems are shown, it is important to note that other operating system including mobile operating systems are within the true scope of the presently claims invention.

Also, shown are examples of additional factors used to sort and select the trial software icons such as ranking 920. The ranking could be based on number of downloads where the trial software with the highest downloads are ranked higher. Another factor is rating 922. The rating can be based on user feedback, third party feedback or a combination of both. The trial software with the highest rating would be sorted near the top of the list. Also shown is a price 924 that a software provider may be will to pay to have their software placed in the list higher. This would be similar to other online search based advertising, where the price can be bid on for a period of time. The trial software with the higher price would be near the top of the list. Other factors may be used as well to sort the icons. Moreover, the trial software icons may change position with respect to messaging window in a one dimensional, two dimensional or three-dimensional order based on one more sorting factors. In another example in lieu of or in addition to the position of the trial software icons changes, the appearance of the trial software icons changes. Appearance of the trial software icons may be any change in size, color, font, shape, or animation to denote order based on one more sorting factors. The phrase "position with respect to messaging window" refers to a trial software icons being sorted and placed in a one dimensional, two dimensional or three-dimensional order based on one more sorting factors. Therefore two users receiving the same file attachment may have the trial software icon presented differently depending on operating system, and time of day, all of which may affect price and ranking, etc.

Operation of Trial Software Manager with Client Computing Device

Figure 10:
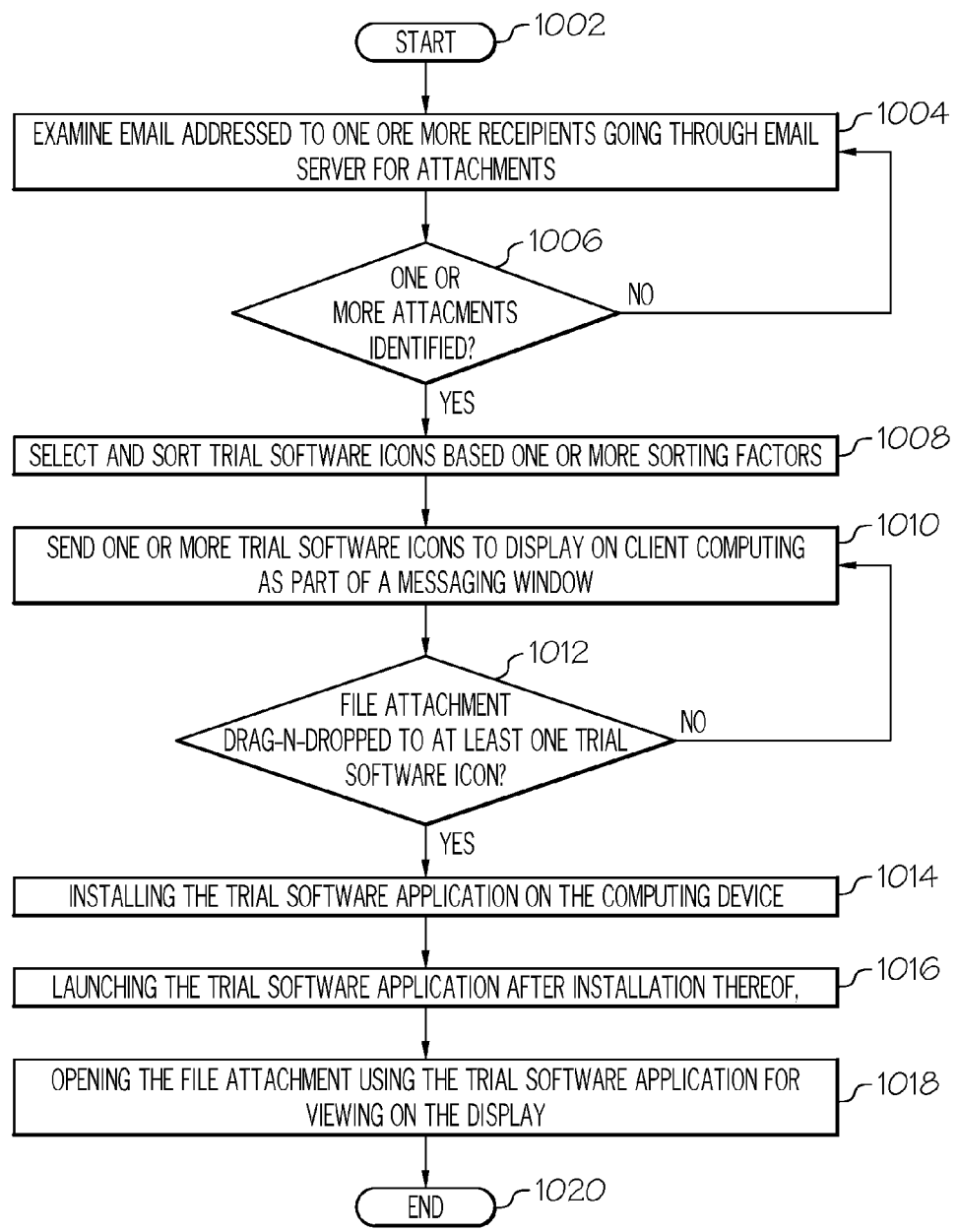
FIG. 10 is a flow chart depicting operating of the trial software manager with a client computing device.

As mentioned above, the trial software manager 110 selects software applications that are compatible with an attachment sent as part of a message to a user. The trial software manager 110 also prioritizes the display of the trial software icons 260, 262, 264, 266 according to one or more sorting factors. These selected and sorted trial software icons 260, 262, 264, 266 are sent by the trial software manager 110 to the client computing devices 138, 140, 142, 144. Turning now to FIG. 10, shown is a flow chart depicting operating of the trial software manager 110 with a client computing device client computing devices 138, 140, 142, 144. The process begins in step 1002 and immediately proceeds to step 1004 where the trial software manager 110 examines emails/messages being sent to one or more email applications 122, 124, 126, 128. A test is made in step 1006. In the event no attachments have been identified, the process loops back to step 1004. Otherwise, in step 1008 the trial software icons are selected and sorted. Examples of sorting factors are shown in FIG. 9. The trial software icons 260, 262, 264, 266 that have been selected are sent to one or more email applications 122, 124, 126, 128. The trial software icons 260, 262, 264, 266 could be sent could be a simple link to the icon using embedded HTML or sending the trial software icons themselves. It is important to note that the trial software icons 260, 262, 264, 266 are most likely to change dynamically with each new attachment received by an email client depending on the sorting factors. Next, in step 1012, the trial software manger determines in the email applications 122, 124, 126, 128 if the file attachment has been dragged-and-dropped to one or trial software icons 260, 262, 264, 266. The email applications may be a web-based email application, or as a plug-in/addition to a stand-alone email client. While waiting for the file attachment to be dragged-n-dropped, the process loops back to step 1010. Otherwise, in the event the file attachment has been dragged-n-dropped to one or trial software icons client computing devices 138, 140, 142, 144 the process proceeds to step 1014, where the trial software is automatically installed. In one example, all the steps 1014, 1016, 1018 are performed automatically without any interaction from a user. In another example, an "accept button" (not shown) to ensure the licensing terms and conditions of the trial software has been accepted. The trial software in step 1016 is launched and the file attachment is now automatically displayed in step 1018 without any user interaction. Moreover, the display of the file attachment by the trial software application in one example, automatically brings this window to the foreground and/or minimizes the messaging applications. This is important for computing devices, such as mobile devices, in which the screen size is limited. The process concludes in step 1020.

In another example two or more occurrences of trial software icons 260, 262, 264, 266 in step 1010 are selected. The trial software icons could be selected because they are positioned next to or adjacent to each other in the messaging window 200 or selected with special keyboard key, such as a "cntrl" key being depressed to select more than one trial software icon 260, 262, 264, 266. Then depending on the exact total number of trial software icons being selected, the corresponding number of trial software applications are automatically installed in steps 1014 through 1018.

Continuing further, two trial software icons could be selected—a first version of the trial software application and a second version of the trial software application. The trial software application can be different versions of the same application e.g., version 1 of paint program from company A and version 2 of paint program from company A, or trial software applications could be two different applications entirely e.g. two different paint programs from different companies, company A and company B. This permits quick side-by-side comparison of using the content in the file attachment 240 with more than one trial software application. Further, in the event that the user selects one of the trial software applications in the comparison, the trial software manager 110, in one example, automatically uninstalls all the trial software applications that were not selected. This greatly reduces the effort of the user to compare trial software applications when opening the file attachment.

Still further, in another example two or more occurrences of trial software icons 260, 262, 264, 266 in step 1010 may behave as a "joint" or "composite" trial software icon because two or more icons are position in the messaging window 200 so close to each other as determined by a settable threshold distance or the two or more icons simply touching each other. In this example, dragging-and-dropping to a "joint" trial software icon enables a single drag-and-drop action of the file attachment 240 to permit quick side-by-side comparisons. The trial software manager 110 can position the trial software icons automatically to form a "joint" or "composite" icons based on sorting factors, e.g. company A wants to offer side-by-side comparison of two versions of their software e.g. basic and premium. Or company A wants to offer side-by-side comparison with another company's product. In this example, the two trial software icons would be close enough to behave as a "composite" or "joint" icon.

Information Processing System

Figure 11:
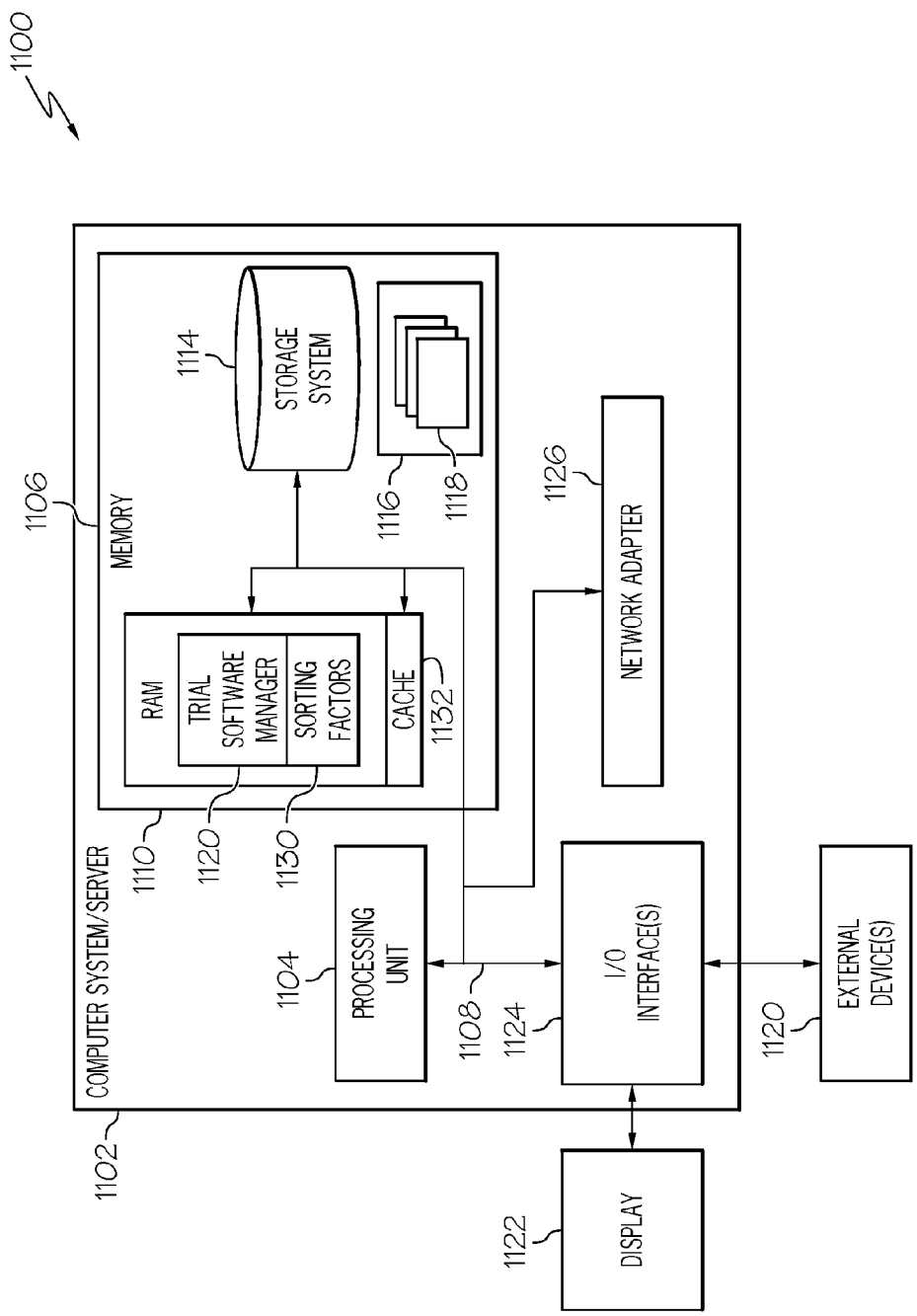
FIG. 11 is a block diagram illustrating one example of an information processing system.

Referring now to FIG. 11, this figure is a block diagram illustrating an information processing system that can be utilized in embodiments of the present invention. The information processing system 1102 is based upon a suitably configured processing system configured to implement one or more embodiments of the present invention (e.g., the Trial Software Manager 110 of FIG. 1). Any suitably configured processing system can be used as the information processing system 1102 in embodiments of the present invention. The components of the information processing system 1102 can include, but are not limited to, one or more processors or processing units 1104, a system memory 1106, and a bus 1108 that couples various system components including the system memory 1106 to the processor 1104.

The bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 11, the main memory 1106 includes the localization manager 150. The localization manager 150 can reside within the processor 1104, or be a separate hardware component. The system memory 1106 can also include computer system readable media in the form of volatile memory, such as random access memory (RAM) 1110 and/or cache memory 1112. RAM 1110 includes a trial software manager 1120 and sorting factor 1130, such as those shown in FIG. 10

The information processing system 1102 can further include other removable/non-removable, volatile/non-volatile computer system storage media. By way of example only, a storage system 1114 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1108 by one or more data media interfaces. The memory 1106 can include at least one program product having a set of program modules that are configured to carry out the functions of an embodiment of the present invention.

Program/utility 1116, having a set of program modules 1118, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. Program modules 1118 generally carry out the functions and/or methodologies of embodiments of the present invention.

The information processing system 1102 can also communicate with one or more external devices 1120 such as a keyboard, a pointing device, a display 1122, etc.; one or more devices that enable a user to interact with the information processing system 1102; and/or any devices (e.g., network card, modem, etc.) that enable computer system/server 1102 to communicate with one or more other computing devices. Such communication can occur via I/O interfaces 1124. Still yet, the information processing system 1102 can communicate with one or more networks such as a local area network (LAN), a general wide area network (WAN), and/or a public network (e.g., the Internet) via network adapter 1126. As depicted, the network adapter 1126 communicates with the other components of information processing system 1102 via the bus 1108. Other hardware and/or software components can also be used in conjunction with the information processing system 1102. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of initiating trial use of a software application, the method comprising:
    displaying on a display coupled to a computing device at least two trial software icons as part of a messaging window, each trial software icon representing a trial software application that is not currently installed on the computing device, with each trial software icon representing distinct and separate versions of the trial software application for an identical application;
    based on moving, using drag-and-drop, an object representing a file attachment in the messaging window to the trial software icon, the messaging windows at least one an email program, a text messaging program, and a web-browser program, automatically performing installing the trial software application on the computing device, launching the trial software application after installation thereof; and
    opening the file attachment using the trial software application for viewing on the display, wherein based on moving the object representing the file attachment includes moving, as a single drag-and-drop action, the object representing the file attachment to two trial software icons positioned adjacent to each other, and wherein the automatically performing further includes:
    installing a first version of the trial software application and a second version of the trial software application on the computing device;
    launching the first version of the trial software application and the second version of the trial software application after installation thereof;
    opening the file attachment in both the first version of the trial software application and the second version of the trial software application to enable side-by-side comparison with the two versions of the trial software application, wherein the two trial software icons behave as a "joint" or "composite" trial software icon to permit a quick side-by-side comparison by a single drag-and-drop action; and
    in response to that one of the trial software applications is selected, automatically uninstalling all the trial software applications that were not selected.

2. The method of claim 1, wherein the at least two trial software icons undergo a change when displayed on the computing device in at least one of 1) an order of position displayed with respect to the messaging window and 2) appearance, based on which trial software has been installed more frequently.

3. The method of claim 1, wherein the at least two trial software icons undergo a change when displayed on the computing device in at least one of 1) an order of position displayed with respect to the messaging window and 2) appearance, based on which trial software has received a higher user rating.

4. The method of claim 1, wherein the at least two trial software icons undergo a change when displayed on the computing device in at least one of 1) an order of position displayed with respect to a position of the messaging window with respect to the messaging window and 2) appearance, based on advertising payments associated with each trial software.

5. The method of claim 1, wherein the automatically performing further comprises:
    automatically minimizing a size of the messaging window on the display.

6. The method of claim 1, wherein the automatically performing further comprises:

automatically moving the trial software applications to foreground of the display.

7. The method of claim 1, wherein the displaying on the display coupled to the computing device the at least two trial software icons on the messaging window includes displaying the at least one trial software icon on a graphical user interface associated with one of an email program, a text messaging program, and a web-browser program.

8. A computing device for initiating trial use of a software, the computing device comprising:
   a memory;
   a processor communicatively coupled to the memory, where the processor is configured to perform
   displaying on a display coupled to a computing device at least two trial software icons as part of a messaging window, the messaging window is at least one an email program, a text messaging program, and a web-browser program, each trial software icon representing a trial software application that is not currently installed on the computing device, with each trial software icon representing distinct and separate versions of the trial software application for an identical application;
   based on moving, using drag-and-drop, an object representing a file attachment in the messaging window to the trial software icon, automatically performing installing the trial software application on the computing device, launching the trial software application after installation thereof; and
   opening the file attachment using the trial software application for viewing on the display, wherein based on moving the object representing the file attachment includes moving, as a single drag-and-drop action, the object representing the file attachment to two trial software icons positioned adjacent to each other, and wherein the automatically performing further includes:
      installing a first version of the trial software application and a second version of the trial software application on the computing device;
      launching the first version of the trial software application and the second version of the trial software application after installation thereof:
      opening the file attachment in both the first version of the trial software application and the second version of the trial software application to enable side-by-side comparison with the first version and the second version of the trial software application, wherein the two trial software icons behave as a "joint" or "composite" trial software icon to permit a quick side-by-side comparison by a single drag-and-drop action; and
      in response to that one of the trial software applications is selected, automatically uninstalling all the trial software applications that were not selected.

9. The computing device of claim 8, wherein the at least two trial software icons undergo a change when displayed on the computing device in at least one of 1) an order of position displayed with respect to the messaging window and 2) appearance, based on which trial software has been installed more frequently.

10. The computing device of claim 9, wherein the at least two trial software icons undergo a change when displayed on the computing device in at least one of 1) an order of position displayed with respect to the messaging window and 2) appearance, based on which trial software has received a higher user rating.

11. The computing device of claim 9, wherein the at least two trial software icons undergo a change when displayed on the computing device in at least one of 1) an order of position displayed with respect to the messaging window and 2) appearance, based on advertising payments associated with each trial software.

12. The computing device of claim 8, wherein the automatically performing further comprises:
   automatically minimizing a size of the messaging window on the display.

13. The computing device of claim 8, wherein the automatically performing further comprises:
   automatically moving the trial software applications to foreground of the display.

14. The computing device of claim 8, wherein the displaying on the display coupled to the computing device the at least one trial software icon on the messaging window includes displaying the at least two trial software icons on a graphical user interface associated with one of an email program, a text messaging program, and a web-browser program.

15. A non-transitory computer program product for of initiating trial use of a software application, the computer program product comprising a computer readable storage medium having computer readable program code embodied therewith, the computer readable program code configured to:
   display on a display coupled to a computing device at least two trial software icons as part of a messaging window, each trial software icon representing a trial software application that is not currently installed on the computing device, with each trial software icon representing distinct and separate versions of the trial software application for an identical application; and
   based on moving, using drag-and-drop, an object representing a file attachment in the messaging window to the trial software icon, the messaging window is at least one an email program, a text messaging program, and a web-browser program, automatically performing install the trial software application on the computing device, launch the trial software application after installation thereof; and
   open the file attachment using the trial software application for viewing on the display, wherein based on moving the object representing the file attachment includes moving, as a single drag-and-drop action, the object representing the file attachment to two trial software icons positioned adjacent to each other, and wherein the automatically performing further includes:
      installing a first version of the trial software application and a second version of the trial software application on the computing device;
      launching the first version of the trial software application and the second version of the trial software application after installation thereof;
      opening the file attachment in both the first version of the trial software application and the second version of the trial software application to enable side-by-side comparison with the first version and the second version of the trial software application, wherein the two trial software icons behave as a "joint" or "composite" trial software icon to permit a quick side-by-side comparison by a single drag-and-drop action; and
      in response to that one of the trial software applications is selected, automatically uninstalling all the trial software applications that were not selected.

16. The non-transitory computer program product 15, wherein the at least two trial software icons undergo a change when displayed on the computing device in at least one of 1) an order of position displayed with respect to the messaging window and 2) appearance, based on which trial software has been installed more frequently.

17. The non-transitory computer program product 15, wherein the at least two trial software icons undergo a change when displayed on the computing device in at least one of 1) an order of position displayed with respect to the messaging window and 2) appearance, based on which trial software has received a higher user rating.

18. The non-transitory computer program product 15, wherein the at least two trial software icons undergo a change when displayed on the computing device in at least one of 1) an order of position displayed with respect to a position of the messaging window with respect to the messaging window and 2) appearance, based on advertising payments associated with each trial software.

19. The non-transitory computer program product 15, wherein the automatically performing further comprises:
   automatically minimizing a size of the messaging window on the display.

20. The non-transitory computer program product 15, wherein the automatically performing further comprises:
   automatically moving the trial software applications to foreground of the display.

* * * * *